United States Patent [19]
Palmer

[11] Patent Number: 5,644,425
[45] Date of Patent: Jul. 1, 1997

[54] NIGHT VISION MONOCULAR WITH UNISTRUCTURAL OPTICAL BED

[75] Inventor: Gary L. Palmer, Vinton, Va.

[73] Assignee: Itt Corporation, New York, N.Y.

[21] Appl. No.: 557,600

[22] Filed: Nov. 14, 1995

[51] Int. Cl.[6] ................................. G02B 23/00
[52] U.S. Cl. .............. 359/409; 359/407; 359/410; 359/399
[58] Field of Search ................. 359/363, 353, 359/355, 330, 350, 400, 403, 407, 409, 412, 808, 811, 819, 399, 809, 810, 410, 425, 506, 703, 826; 396/341, 529, 530

[56] References Cited

U.S. PATENT DOCUMENTS

| 5,204,774 | 4/1993 | Owen, Jr. et al. | 359/418 |
| 5,495,364 | 2/1996 | Palmer | 359/412 |

FOREIGN PATENT DOCUMENTS

| 0249545 | 9/1987 | Germany | 359/425 |

*Primary Examiner*—Paul M. Dzierzynski
*Assistant Examiner*—Mark Robinson
*Attorney, Agent, or Firm*—Plevy & Associates

[57] ABSTRACT

A night vision device having an image intensifier tube, collimator lenses and at least one aspheric ocular lens are retained within a unistructurally formed optical bed. The optical bed is essentially a tubular structure having a large receptacle at one end to receive the image intensifier tube. The tubular structure is configured so that the various collimator lenses can be stacked within the tubular structure in a highly precise yet labor and cost efficient manner. A housing is provided that conforms to the shape of the electro-optical subassembly. The housing has a substantially similar ocular end structure and objective end structure. An objective lens assembly and ocular lens assembly are retained by the housing. Both the objective lens assembly and the ocular lens assembly contain at least one lens held with a commonly shaped lens casing. Since the lens casings for both the ocular lens assembly and the objective lens assembly are substantially the same and the object and objective ends of the housing are substantially the same, a common focusing assembly can be used on both the objective end and the ocular end of the housing. The use of identical parts in both the objective and the ocular of the night vision device, as well as the use of the optical bed provides for a night vision device that is low cost to manufacture and easy to assemble.

20 Claims, 6 Drawing Sheets

NIGHT VISION MONOCULAR WITH UNISTRUCTURAL OPTICAL BED

BACKGROUND OF THE INVENTION

1. Field of the Invention

The present invention relates to optical devices that enable a viewer to observe objects at night or during other low-light conditions. More specifically, the present invention relates to a handheld night vision monocular device with a unistructural optical bed that increases quality and enables the monocular to be manufactured with both reduced labor and cost.

2. Description of the Prior Art

Night vision devices are widely used in the military to provide soldiers, aviators and sailors with the ability to view objects at night or during other low light conditions. As a result, many night vision devices are currently being manufactured according to exacting military specifications and designs. Similarly, many such night vision devices are being manufactured for specific military applications such as part of the sights of various weapons or as part of goggle assemblies that attach to an aviator's or soldier's helmet. As a consequence, many of the night vision devices currently being manufactured are neither affordable nor easily adapted to non-military uses by the general public.

Night vision devices typically include an image intensifier tube that converts low intensity and/or infrared energy into visible light. Such night vision devices typically require sophisticated power supplies and circuitry to control the operation of the image intensifier tube and sophisticated optical arrangements that direct the infrared energy into the intensifier tube and visible light away from the image intensifier tube. In military applications, the various military personnel are trained in how to use and adjust the night vision devices they are issued. However, a night vision device designed for use by the general public must have simple adjustments that can be readily operated by a variety of different users in a dark environment. Preferably, a night vision device designed for the general public would have little or no adjustments so that a person need only turn on the device and look through it to obtain night vision.

As military sales wain, more and more night vision devices are being marketed directly to the general public. However, few of such prior art night vision devices are designed to be both low cost and east to operate. ITT Corporation, the assignee herein, manufactures a variety of night vision devices for military and the general public. Examples of some of the handheld night vision devices that are being sold to the public are shown in U.S. patent application Ser. No. 08/108,989 entitled NIGHT VISION BINOCULARS, filed Aug. 18, 1993 and U.S. patent application Ser. No. 08/405,172 entitled COMPACT NIGHT VISION DEVICE, filed Mar. 16, 1995. Such prior art night vision devices are far easier to use and are much less expensive than are their military counterparts. However, even these night vision devices have complex focusing mechanisms and folded optics that add significantly to the overall cost of the night vision device.

Some of the most expensive components contained within a night vision device are the various lenses used in the optical train of the night vision device. Not only are the optical elements themselves expensive but the assembly of the optics into an optical train is typically highly labor intensive. Lens elements must be exactly spaced in order to perform properly. This means that a night vision housing must be manufactured to exacting tolerances if the housing is used to retain the various lens elements in place. Molding plastic housings to exacting tolerances require highly complex molding tools and expensive raw materials. The molding of plastic housings to exacting tolerances also results in a high percentage of scrap parts that do not meet the required specifications. Even if proper housings are provided, a great deal of labor is still required in order to mount the various lens elements into the housing. The labor intensive procedure adds greatly to the overall cost of the night vision device and produces a device whose quality depends upon the skill by which that device was assembled.

In the prior art, many night vision devices have been designed with simplified optics in order to reduce the cost of the night vision device for the commercial marketplace. Such night vision devices are exemplified by co-pending U.S. patent application Ser. No. 08/497,200 to Palmer, the inventor herein, entitled NIGHT VISION MONOCULAR WITH BALANCED OPTICS and assigned to ITT Corp., the assignee herein. Although such other night vision devices do have low cost optics, the optics are still held in place and are aligned by the shape of the night vision housing. Consequently, the quality of the night vision device is highly dependent upon how exactly the housing of the night vision device is manufactured and how well the various optical components are assembled within the housing of the night vision device.

It is therefore an objective of the present invention to provide a night vision device with a simple, low-cost optical bed that is not part of the night vision device housing and is capable of retaining the various optical elements along the optical path in an exacting manner It is a further object of the present invention to provide a method of assembling a night vision device using a low-cost optical bed.

SUMMARY OF THE INVENTION

The present invention is a night vision device wherein an image intensifier tube, collimator lenses, and at least one aspheric ocular lens are retained within a unistructurally formed optical bed. The optical bed is essentially a tubular structure having a large receptacle at one end to receive the image intensifier tube. The tubular structure is configured so that the various collimator lenses can be stacked within the tubular structure in a highly precise yet labor and cost efficient manner. The optical bed also contains various structures that enable a power supply module, batteries, a control circuit board and an on off switch to be attached to the optical bed, thereby producing an electro-optical subassembly that is the heart of the night vision device.

The electro-optical subassembly based upon the optical bed has all the components needed to achieve night vision except for an objective lens assembly to focus light on the image intensifier tube and an ocular lens assembly to focus the viewed image. A housing is provided that conforms to the shape of the electro-optical subassembly. The housing has a substantially similar ocular end structure and objective end structure. An objective lens assembly and ocular lens assembly are retained by the housing. Both the objective lens assembly and the ocular lens assembly contain at least one lens held with a commonly shaped lens casing. Since the lens casings for both the ocular lens assembly and the objective lens assembly are substantially the same and the object and objective ends of the housing are substantially the same, a common focusing assembly can be used on both the objective end and the ocular end of the housing. The use of identical parts in both the objective and the ocular of the night vision device, as well as the use of the optical bed provides for a night vision device that is low cost to manufacture and easy to assemble.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE INVENTION

Although the optical design of the present invention night vision device can be used in many different applications where an image intensifier tube is used to provide night vision capabilities, such as night vision goggles, weapon sites and the like, the present invention is especially well suited for use as a handheld night vision monocular. Accordingly, the present invention will be described as a night vision monocular assembly in order to set forth the best mode of the invention.

Figure 1:
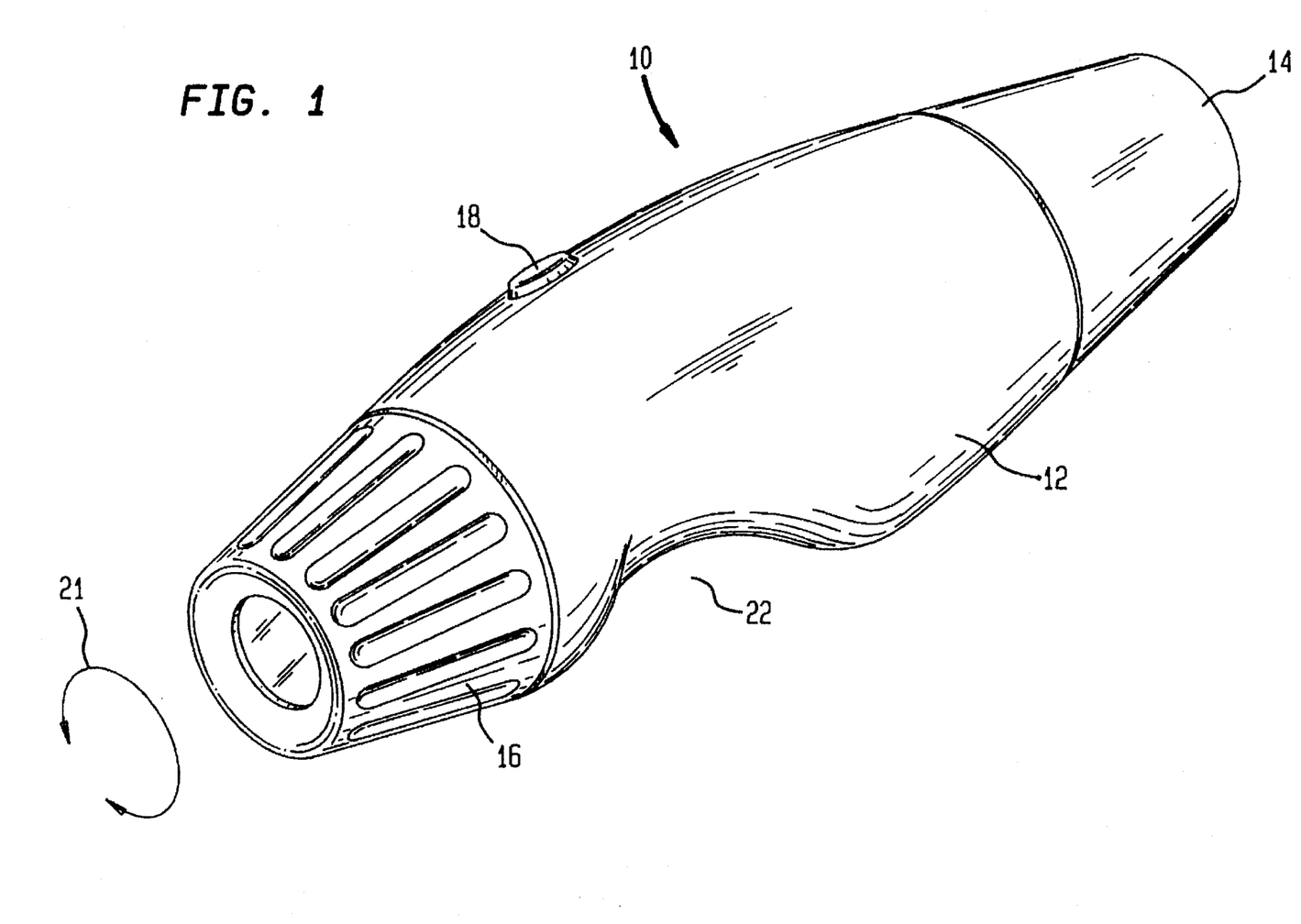
FIG. 1 is a perspective view of one preferred embodiment of the present invention night vision monocular.

Referring to FIG. 1, there is shown a night vision monocular assembly 10. The optics of the monocular assembly 10 are contained within a housing 12. As will be later explained, a first large elastomeric end cap 14 is disposed proximate the objective end of the housing 12. Similarly, a second elastomeric end cap 16 is disposed proximate the ocular end of the housing 12. The two elastomeric end caps 14, 16 protect the optics of the monocular assembly 10, should the monocular assembly 10 be dropped. Furthermore, the two elastomeric caps 14, 16 are shaped to match the curvature of the housing 12, thereby providing the monocular assembly with its unique torpedo shape. The night vision monocular assembly 10 has only a single electrical control. The single electrical control is an on/off button 18 located on the top of the housing. As will later be explained, includes an ocular focus adjustment that is operated by rotating the proximal elastomeric end cap 16 in the directions of arrow 21. An objective focus adjustment is achieved by rotating the distal elastomeric end cap 14 in the directions of arrow 21. By providing a night vision device with an on/off switch and simple optical adjustments, a night vision device is provided that can be easily used by most any person, wherein the person using the night vision monocular 10 need only to turn the monocular on and look through its optics.

Figure 2:
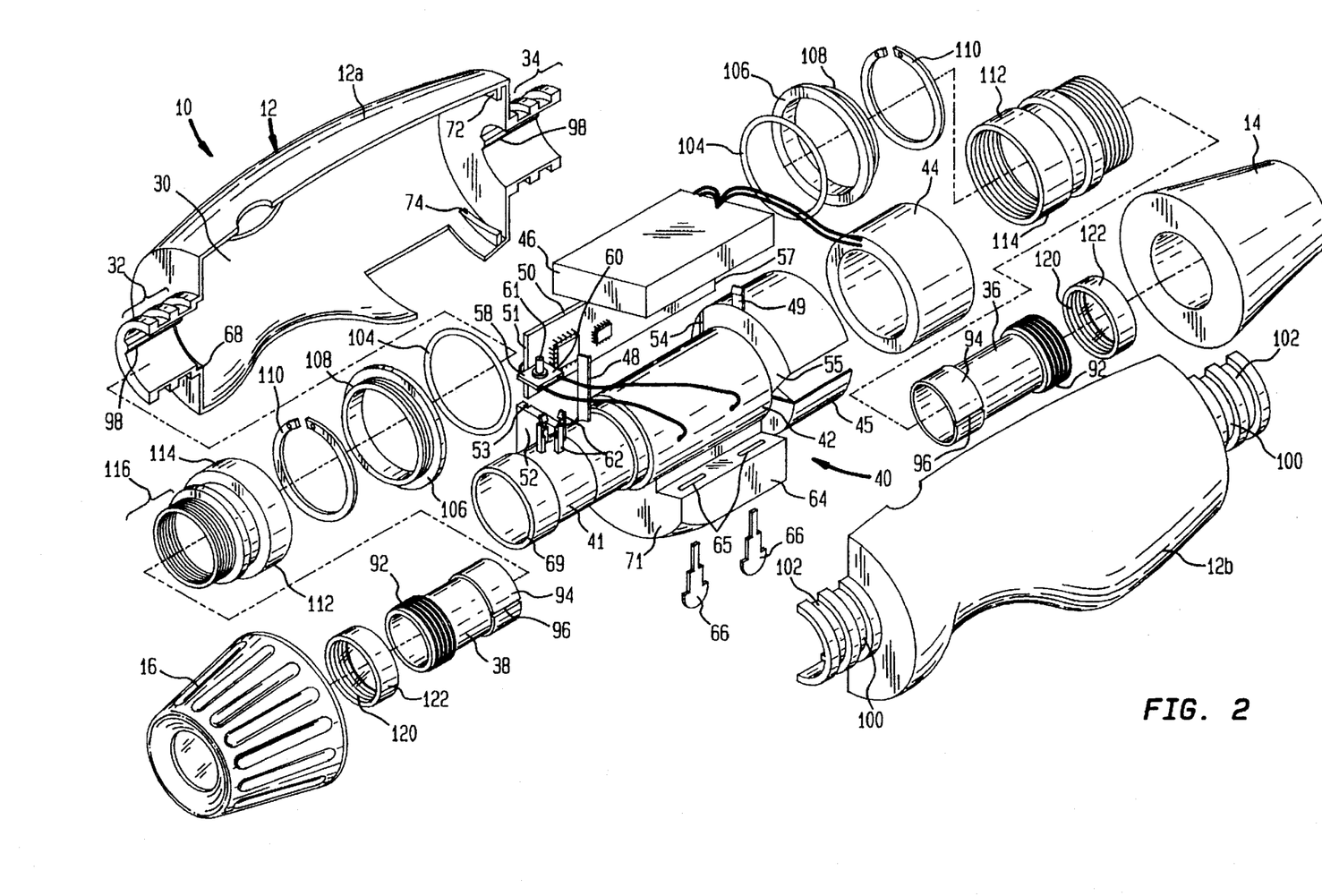
FIG. 2 is an exploded perspective view of the embodiment of the present invention shown in FIG. 1.

A large relief 22 is provided within the shape of the housing 12. The relief 22 is shaped to accommodate the space on a person's hand in between the thumb and the forefinger. As such, the housing 12 is ergonomically configured to be held by one hand. As a person grips the housing 12 and places his finger thumb and forefinger around the relief 22, the forefinger of the hand passes over the on/off button 18. As a result, a person can grip housing 12 and operate the device without having to change the position of the hand on the housing. This prevents users from having to search for different controls in the dark environment in which the night vision device is typically used. Referring to FIG. 2, it can be seen that the housing 12 of the preferred embodiment night vision monocular 10 includes two housing halves 12A, 12B that join along a common joint line. When the housing halves 12A, 12B are assembled they define a housing having a large central enclosure 30. The housing 12 also contains two elongated neck sections 32, 34 that define cylindrical openings, wherein the cylindrical openings communicate with large central enclosure 30. As will later be detailed, an objective lens assembly 36 is retained in the forward neck section 34 of the housing 12. Adversely, an ocular lens assembly 38 is retained in the rearward neck section 32 of the housing 12. All of the components of the night vision monocular 10 that are contained within the large central enclosure 30 of the housing 12 are assembled as part of an electro-optical subassembly 40. The electro-optical subassembly contains all the electrical components and optical components needed for the operation of the night vision monocular 10, other than the objective lens assembly 36 and the ocular lens assembly 38.

In the shown embodiment, the electro-optical subassembly 40 is comprised of an optical bed 42 upon which, or in which, all the other elements of the sub-assembly are mounted. The optical bed 42 is preferably a unistructurally molded unit having a generally tubular shape. At one end of the optical bed 42 is formed a cylindrical receptacle 45 for enveloping an image intensifier tube 44 and retaining the image intensifier tube 44 with an interference fit. The image intensifier tube 44 is preferably a GEN II tube, however a GEN III tube can also be used. A potted power supply module 46 is coupled to the image intensifier tube 44, wherein the power supply module 46 provides the various electrical biases to the image intensifier tube 44 needed for its operation. Two pawls 48, 49 extend upwardly from the optical bed 42 and engage the power supply module 46 so that the power supply module 46 is held flush against the top of the optical bed 42.

A circuit board 50 is electrically connect to the power supply module 46 and the image intensifier tube 44. The circuit board 50 contains the various control circuits needed for the operation of the image intensifier tube 44. Such control circuits are well known and commonly used in prior art night vision devices. A flange wall 52 extends from the rearward side of the optical bed 42. A groove 53 is disposed in the flange wall 52 that is sized to receive the proximal side edge 51 of the circuit board 50. A second parallel groove 54 is formed in the rear surface 55 of cylindrical receptacle 45. The second groove 54 is sized to receive the distal side edge 57 of the circuit board 50. As a result, the circuit board 50 is retained by the optical bed 42 by the passage of the edges of the circuit board 50 into the first groove 53 on the flange wall 52 and the second groove 54 on the rear of the cylindrical receptacle 45.

An on/off switch 58 is electrically coupled to the circuit board 50, wherein the or/off switch controls the flow of electricity to the circuit board 50. The on/off switch 58 has a square base 60 upon which a tactile activator 61 extends. Four pawls 62 extend upwardly from the optical bed 42 and engage the square base 60 of the on/off switch 58, thereby mechanically joining the on/off switch 58 to a set position on the optical bed 42.

A battery receptacle 64 is disposed at the bottom of the optical bed 42 and is preferably unistructurally formed as part of the optical bed 42. The battery receptacle 64 is sized to receive batteries (not shown) which supply power to the image intensifier tube 44. Apertures 65 are disposed through the battery receptacle 64 through which various conductive terminals 66 pass. The conductive terminals 66 contact the various batteries retained within the battery receptacle 64 and electrically join the batteries to the circuit board 50, via the on/off switch 58.

Figure 3:
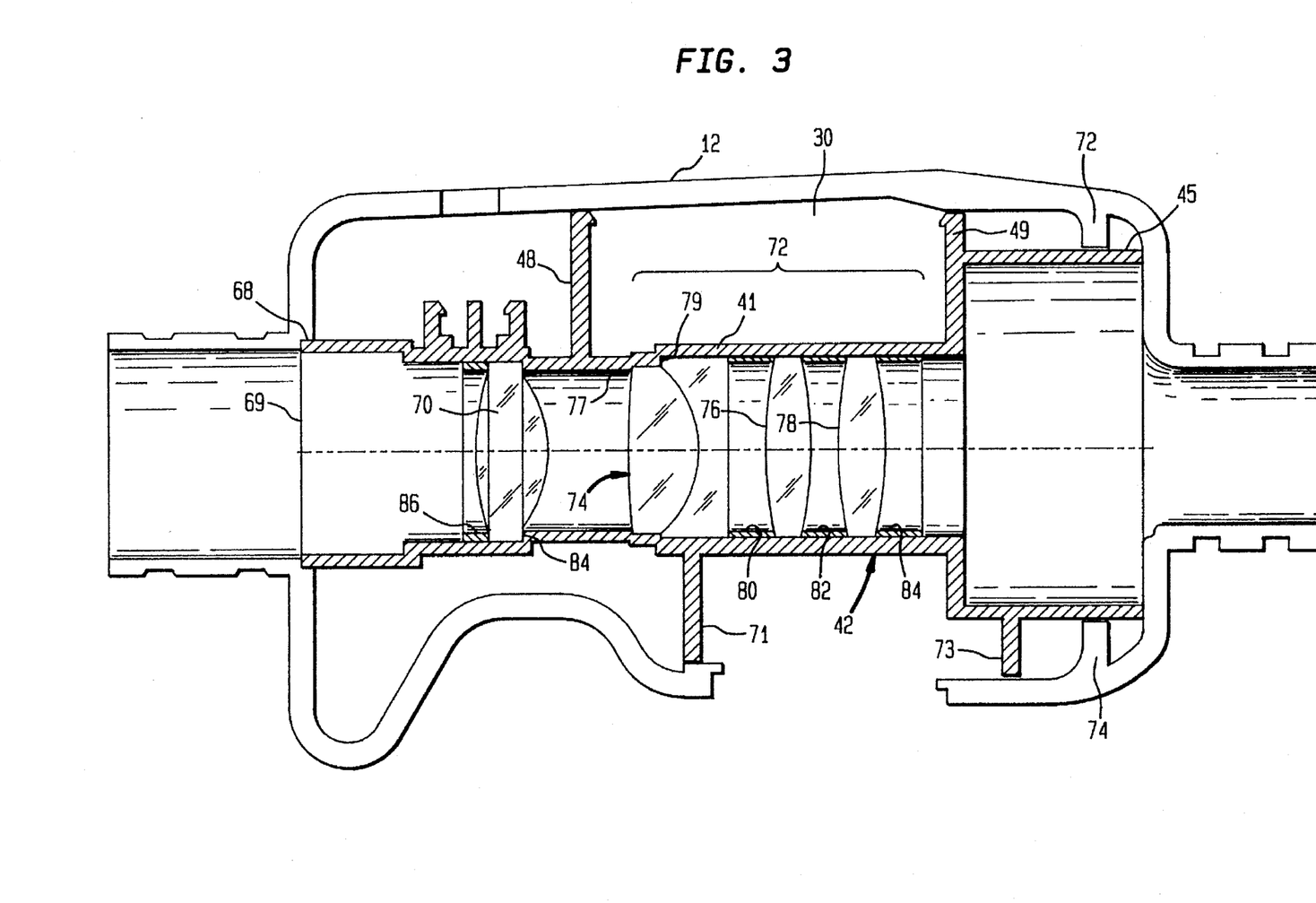
FIG. 3 is a cross-sectional view of the ocular component of the present invention, shown in conjunction with the housing illustrate the interconnection of these two pieces.

Referring to FIG. 2 in conjunction with FIG. 3, it can be seen that optical bed 42 which is the frame of the electrooptical subassembly 40 (FIG. 2) is configured to fit within the central enclosure 30 of the housing 12. The length of the optical bed 42 is essentially the same as the length of the central enclosure 30 of the housing 12, wherein the cylindrical receptacle 45 abuts against the objective end of the central enclosure 30 and the opposite end of the optical bed 42 abuts against the ocular end of the central enclosure 30. As a result, the optical bed 42 held into place and prevented from moving along its length. A groove 68 is formed at the optical end of the central enclosure 30. The ocular end 69 of the ocular bed 42 rests within the groove 68, wherein the groove 68 prevents the lateral movement of the ocular end 69 of the optical bed 42. The pawls 48, 49 that retain the power supply module 46 (FIG. 2) abut against the top surface of the housing 12. Adversely, the walls 71, 73 of the battery receptacle 64 abut against the bottom surface of the housing 12. The abutment of the various elements against the top and bottom surfaces of the housing 12 prevents the center of the optical bed 42 from moving laterally. Lastly, two small ribs 72, 74 extend inwardly from the housing 12. The small fibs 72, 74 abut against the cylindrical receptacle 45 and prevent the cylindrical receptacle portion of the optical bed 42 from moving laterally. As a result, even though the optical bed 42 is not mechanically or adhesively joined to the housing 12, the optical bed 42 is held into a set position by the housing 12. Consequently, the image intensifier tube 44 (FIG. 2), power supply module 46 (FIG. 2), circuit board 50 (FIG. 2) and on/off switch 58 (FIG. 2) can be preassembled to the optical bed 42 and the entire electrooptical subassembly 40 can be simply placed into the housing 12 ready for operation.

At the center of the optical bed 42 is a tubular structure 41 that extends from an open ocular end 69 to the opposite open cylindrical receptacle 45. As can be seen from FIG. 3, it can be seen that a plurality of lens elements are contained within the tubular structure 41 of the optical bed 42. The lenses include an aspheric lens 70 and a collimator assembly 72. The collimator assembly 72 contains a doublet 74 and two biconvex lens 76, 78. The optical bed 42 is preferably molded as a unistructural piece. As a result, the various lenses are added to the optical bed 42 after it is molded. Within the tubular structure of the optical bed 42 are formed two ledges 77, 79. When assembling the lenses into the optical bed 42, the doublet 74 is passed into the optical bed 42 through the open cylindrical receptacle 45. The surfaces of the doublet 74 rest upon the ledges 77, 79, thereby retaining the doublet 74 at a set position. A first spacer 80 is then placed into the optical bed 74 through the open cylindrical receptacle 45. The first spacer 80 is followed by the first biconvex lens 76, wherein the first spacer 80 separates the first biconvex lens 76 from the doublet 74. As second spacer 82 separates the first biconvex lens 76 from the second biconvex lens 78. A third spacer 84 is inserted behind the second biconvex lens 78 and is glued into place thereby setting the collimator assembly 72 into a set configuration.

Since spacing elements are used to separate the doublet 74 from the two biconvex lenses 76, 78, the quality of the spacers determines the accuracy of the spacial positioning and no features with exacting tolerances needs to be molded within the optical bed 42.

The aspheric lens 70 is advanced into the optical bed 42 through the open ocular end 69. The aspheric lens 70 rests upon a ledge 84 formed within the tubular structure 41 of the optical bed 42. The aspheric lens 70 is held in place by a spacer 86 that is glued to the optical bed 42. As can be seen, the only dimension in the optical train controlled by the physical formation of the optical bed 42 is the distance between the doublet 74 and the aspheric lens 70. This dimension is governed by the distance the aspheric ledge 84 and the doublet ledges 77, 79. As will be recognized by a person skilled in the art of injection mold tool making, a tubular structure such as the optical bed 42 is formed by advancing two opposing cylindrical mandrels within the injection mold until the two mandrels touch. Accordingly, the precise spacing of the distance between the aspheric ledge 84 and the doublet ledges 77, 79 can be achieved without complex tooling or complex molding procedures. Rather, the doublet ledges 77, 79 are formed by the shape of a first mandrel and the aspheric ledge 84 is formed where the first mandrel and a second mandrel abut. As a result, precise spacing between the doublet ledges 77, 79 and the aspheric ledge 84 is inherent to the molding procedure.

In the shown embodiment, glass lenses are illustrated within the collimated assembly 72. There are many optical designs for collimator assemblies used in the prior art night vision devices. Any such collimator assembly design can be adapted to the present invention. It will also be understood that plastic lenses can be used within the collimator assembly 72 to reduce cost and weight. Plastic lens can be molded with flared peripheral rims. As such, with the appropriate degree of flaring, plastic lenses can be assembled into the optical bed 42 without the need for separate spacing elements.

Figure 4:
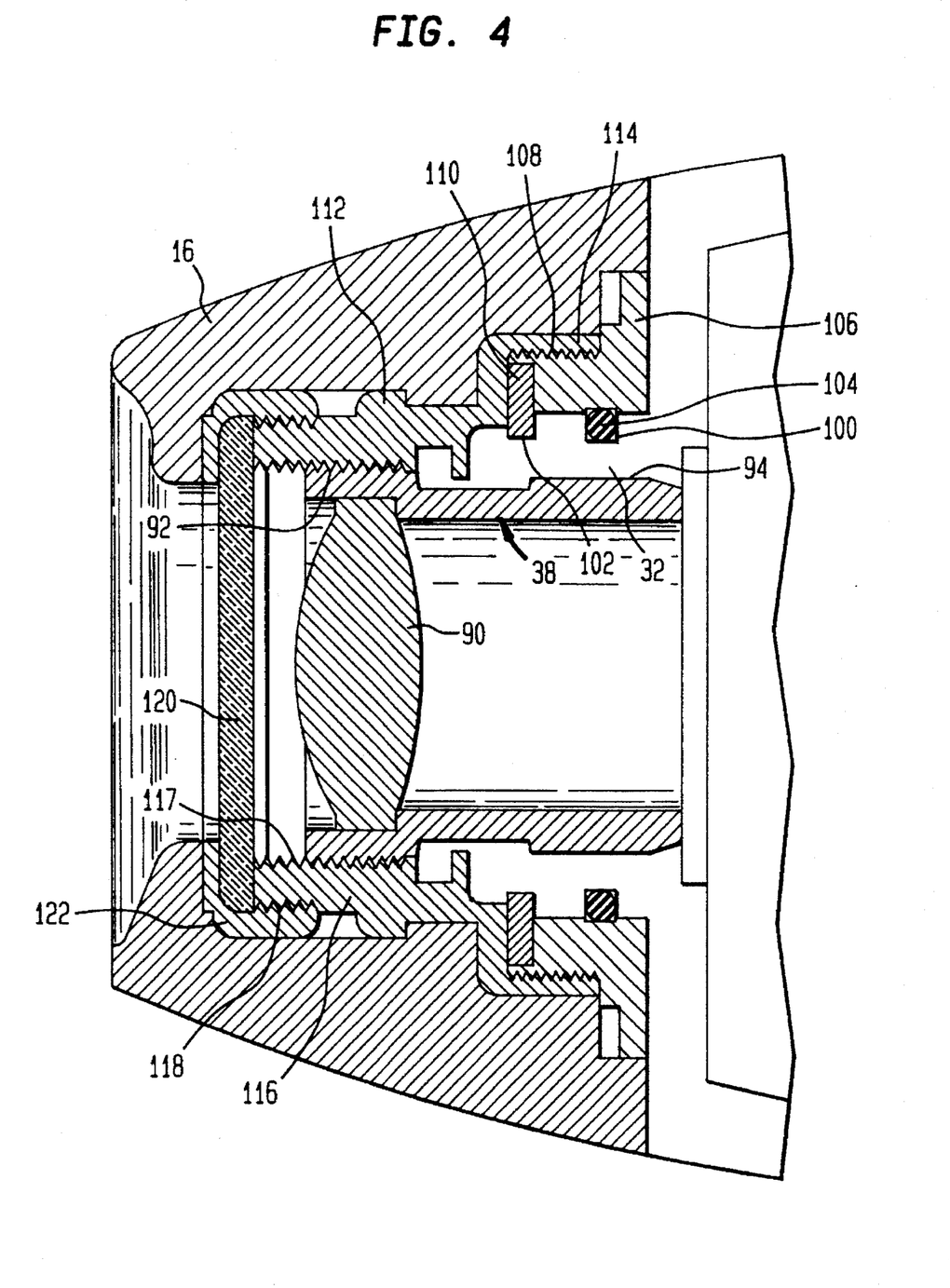
FIG. 4 is a cross-sectional view of the ocular lens assembly of the present invention night vision monocular.

Referring now to FIG. 2 in conjunction with FIG. 4, it can be seen that the ocular lens assembly 38 extends into the ocular neck section 32 of the housing 12, wherein the ocular lens assembly 38 is optically aligned with the optical elements within the optical bed 42 (FIG. 2). The ocular lens assembly 38 itself is a tubular molded piece containing a single aspheric lens 90 (FIG. 4). The aspheric lens 90 (FIG. 4) in the ocular lens assembly 38 and the aspheric lens 70 in the optical bed 42 (FIG. 3) serve as the eyepiece optics of the night vision monocular 10. The use of two aspheric lenses in the eyepiece optics of a night vision device is common place in the art. As such, it should be understood that any previously used set of aspheres can be adapted for use in the present invention.

The ocular lens assembly 38 has an external threaded region 92 at one end. At the end opposite the external threaded region 92, a thickened region 94 is provided in which are formed two slots 96 (FIG. 2). In the ocular neck section 32 of the housing 12 are disposed two opposing key guides 98 (FIG. 2). The key guides 98 pass into the slots 96 on the ocular lens assembly 38 and thereby restrict the movement of the ocular lens assembly 38. Since the key guides 98 on the housing 12 engage the slots on the ocular lens assembly 38, the ocular lens assembly 38 is restricted to movement along its longitudinal axis which thereby maintains the optical alignment of the ocular lens assembly 38 with the optical elements within the optical bed 42.

On the exterior of the ocular neck section 32 of the housing 12 are formed two grooves 100, 102 that are used in coupling the two halves of the housing together. An O-ring 104 passes through the first groove 100, binding the two halves of the housing 12 together. A base collar 106 passes over the ocular neck section 32 and the O-ring 104. The base collar 106 has an external threaded region 108. A C-clamp 110 engages the second groove 102 on the ocular neck section 32. The C-clamp 110 abuts against the base collar 106 and seats the bottom of the base collar 106 flush against the housing 12. A focus collar 112 passes over the ocular neck section 32. The focus collar 112 has a first internally threaded region 114 that is sized to engage the external threaded region 108 of the base collar 106. The threaded interconnection between the focus collar 112 and the base collar 106 is preferably sealed with a thread locking material to prevent the unthreading of these components.

The focus collar 112 has a reduced neck region 116 that is threaded both on its interior surface 117 and exterior surface 118. The threading on the interior surface 117 engages the external threaded region 92 of the ocular lens assembly 38. As a result, when the focus collar 112 is rotated around its central axis, the ocular lens assembly 38 moves back and forth along its longitudinal axis. The ocular lens assembly 38 therefore can be selectively moved back and forth across a given range by the selective rotation of the focus collar 112. As the ocular lens assembly 38 is moved reciprocally, the distance between the aspheric lens 90 in the ocular lens assembly 38 and the optical bed 42 (FIG. 2) changes, thereby providing an adjustable focus.

A protective afocal window 120 covers the open end of the focus collar 112. The window 120 is held in place by a cap 122 that threads onto the threaded exterior surface 118 of the focus collar 112. The elastomeric end cap 16 passes over the focus collar 112 and engages the focus collar 112 with an interference fit. As a result, when the elastomeric end cap 16 is rotated, the focus collar 112 rotates and selective focusing is achieved.

A key feature of the present invention night vision monocular 10 is the ability of the night vision monocular 10 to be manufactured at low cost. In the shown embodiment of the present invention night vision monocular 10, the night vision monocular 10 is designed with mechanical symmetry, wherein the components used to focus the ocular of the night vision monocular are identical to the components used to focus objective of the night vision monocular. The use of redundant components simplifies tooling and assembly, thereby reducing the cost of the overall device.

Figure 5:
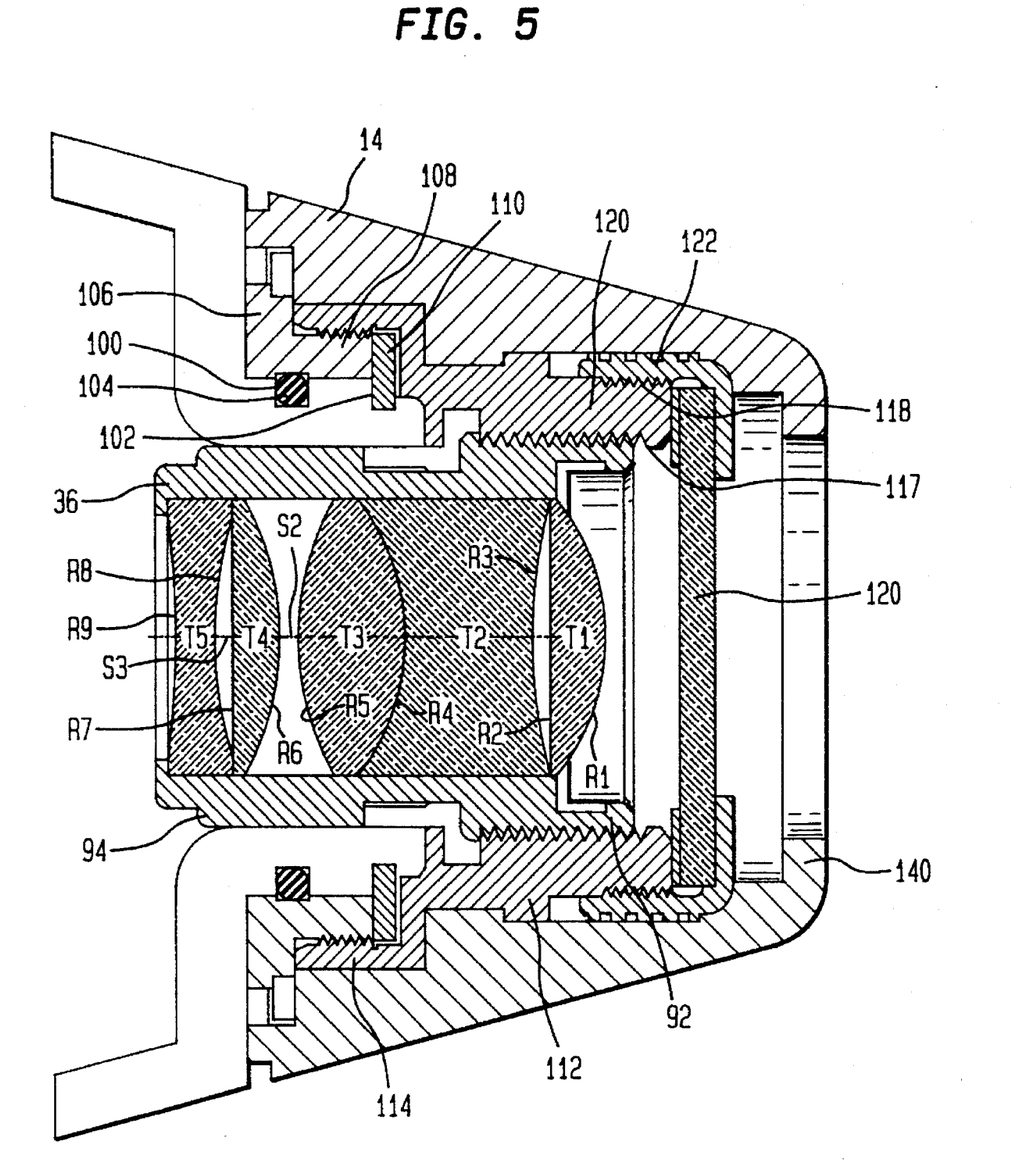
FIG. 5 is a cross-sectional view of the objective lens assembly of the present invention night vision monocular.

Referring to FIG. 2 in conjunction with FIG. 5, the details of the objective end of the night vision monocular 10 are shown. Components that are the same as those use and described in the ocular end of the device will be referenced with the same reference numbers in order to better express the physical equivalency of the components.

The casing of the objective lens assembly 36 is essentially the same as that of the ocular lens assembly 38. The only difference being the lens element contained within those casings. The objective lens assembly 36 has an external threaded region 92 at one end. At the end opposite the external threaded region 92, a thickness region 94 is provided in which are formed two slots 96 (FIG. 2). In the objective neck section 34 of the housing 12 are disposed two opposing key guides 98. The key guide 98 pass into the slots 96 on the objective lens assembly 36 and thereby restrict the movement of the objective lens assembly 36. Since the lens guides 98 on the housing 12 engage the slots on the objective lens assembly 36, the objective lens assembly 36 is restricted to movement along its longitudinal axis which thereby maintains the optical alignment of the objective lens assembly 36 with the optical elements on the optical bed 42.

On the exterior of the objective neck section 34 of the housing 12 are formed two grooves 100, 102 that are used in coupling the two halves of the housing together. An O-ring 104 passes through the first groove 100, binding the two halves of the housing 12 together. A base collar 106 passes over the objective neck section 34 and the O-ting 104. The base collar 106 has an external threaded region 108. A C-clamp 110 engages the second groove 102 on the objective neck section 34. The C-clamp 110 abuts against the base collar 106 and seats the bottom of the base collar 106 flush against the housing 12. A focus collar 112 passes over the objective neck section 34. The focus collar 112 has a first internally threaded region 114 that is sized to engage the external threaded region 108 of the base collar 106. The threaded interconnection between the focus collar 112 and the base collar 106 is preferably sealed with a thread locking material to prevent the unthreading of these components.

The focus collar 112 has a reduced neck region 116 that is threaded both on its interior surface 117 and exterior surface 118. The threading on the interior surface 117 engages the external threaded region 92 of the objective lens assembly 36. As a result, when the focus collar 112 is rotated around its central axis, the objective lens assembly 36 moves back and forth along its longitudinal axis. The objective lens assembly 36 therefore can be selectively moved back and forth across a given range by the selective rotation of the focus collar 112. As the objective lens assembly 36 is moved reciprocally the distance between the objective lens and optical bed change, thereby producing an adjustable focus.

A protective afocal window 120 covers the open end of the focus collar 112. The window 120 is held in place by a cap 122 that threads onto the threaded exterior surface 118 of the focus collar 112. The elastomeric end cap 14 passes over the focus collar 112 and engages the focus collar 112 with an interference fit. As a result, when the elastomeric end cap 16 is rotated, the focus collar 112 rotates and selective focusing is achieved.

In the embodiment of FIG. 5, it can be seen that the objective lens assembly 36 contains five lens elements 130, 131, 132, 133, 134. The dimensions and spacings of the shown five lens elements are set forth in Table 1 below.

TABLE 1

| LENS | GLASS TYPE | SURFACE CURVATURE | MID-LINE THICKNESS | LENS SPACING |
| --- | --- | --- | --- | --- |
| 130 | SF-8/ 689312 | R1 = 15.05 mm | — | — |
|  |  |  | T1 = 3.25 mm | — |
|  |  | R2 = 111.23 mm | — | — |
|  |  |  | — | S1 = 1.20 mm |
| 131 | SF-8/ 689312 | R2-22.8 mm | — | — |
|  |  |  | T2 = 6.5 mm | — |
|  |  | R4 = 9.5 mm | — | — |
| 132 | LAF2/ 74447 | R4 = 9.5 mm | — | — |
|  |  |  | T3 = 6.0 mm | — |
|  |  | R5 = 22.19 mm | — | — |
|  |  |  | — | S2 = 1.3 mm |
| 133 | SK16/ 620603 | R6 = 18.30 mm | — | — |
|  |  |  | T4 = 3.0 mm | — |
|  |  | R7 = 83.62 mm | — | — |
|  |  |  | — | S3 = 1.50 mm |

TABLE 1-continued

| LENS | GLASS TYPE | SURFACE CURVATURE | MID-LINE THICK-NESS | LENS SPACING |
|---|---|---|---|---|
| 134 | SF8/ 689312 | R8 = 12.09 mm | — | — |
|  |  |  | T5 = 1.5 mm | — |
|  |  | R9 = 40.02 mm | — | — |

In FIG. 5 it can be seen that the elastomeric end cap 14 terminates with an overhanging lip 140, wherein an open space exists between the underside of the lip 140 and the protective window 120. The purpose of this configuration is to provide a coupling means for coupling an auxiliary lens assembly to the objective of night vision monocular 10.

Figure 6:
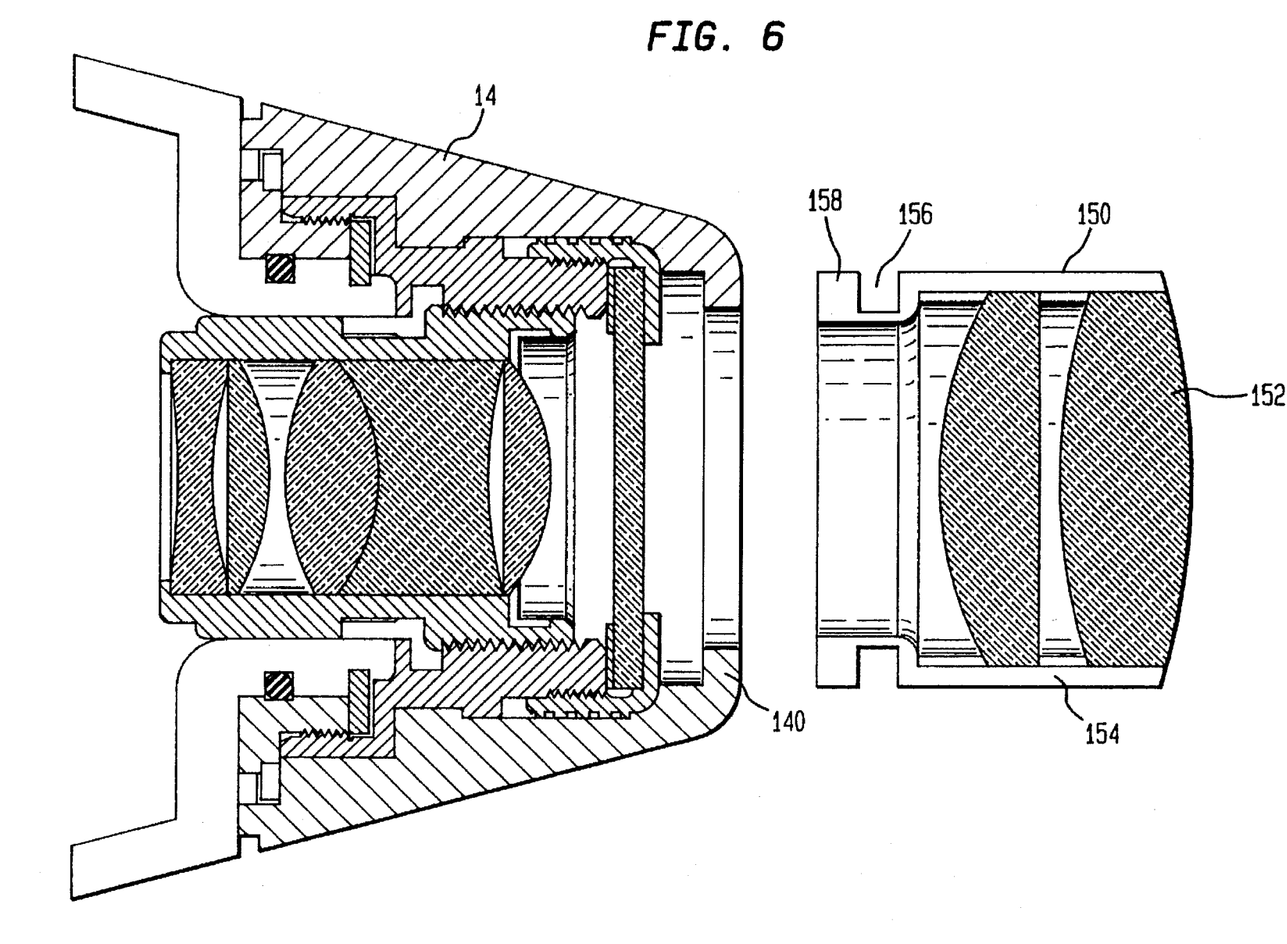
FIG. 6 is a cross-sectional view of the objective lens assembly of the present invention night vision monocular shown in conjunction with an auxiliary lens attachment.

Referring to FIG. 6 there is shown a first embodiment of an auxiliary lens assembly 150. The auxiliary lens assembly 150 can be a magnification lens, wide angle lens or any other specialty lens arrangement. The auxiliary lens assembly 150 includes lenses 152 contained within a casing 154, wherein a groove 156 is disposed in the casing 154 proximate the output end of the assembly. The groove 156 creates an end flange 158 on the auxiliary lens assembly 150 that is sized to fit below the overhanging lip 140 of the elastomeric end cap 14. The groove 156 itself is sized to receive the overlapping lip 140, thereby joining the auxiliary lens assembly 150 to the night vision monocular. Since the end cap 14 is elastomeric, the auxiliary lens can be applied or removed quickly by hand, wherein the end cap 14 deforms to either release or receive the auxiliary lens.

It will be understood that the night vision monocular assembly described herein is merely exemplary and that a person skilled in the art may make variations and modifications to the described embodiments utilizing functionally equivalent optical components to those described. All such variations and modifications are intended to be included within the scope of this invention as defined by the appended claims.

What is claimed is:

1. A night vision device, comprising:
   an objective lens assembly for receiving low intensity light;
   an image intensifier tube for converting the low intensity light into a visible output image;
   a collimator lens arrangement for reimaging the output image of said image intensifier tube at a substantially infinite conjugate;
   an ocular lens assembly for viewing said output image through said collimator assembly;
   an optical bed containing a tubular structure and a receptacle disposed at one end of said tubular structure, wherein said collimator lens arrangement is disposed within said tubular structure and said image intensifier tube is retained within said receptacle so as to be joined to said optical bed and optically aligned with said collimator lens arrangement;
   a housing for receiving said optical bed, said objective lens assembly and said ocular lens assembly, wherein said housing optically aligns said ocular lens assembly with said collimator lens arrangement within said optical bed and aligns said objective lens assembly with said image intensifier tube.

2. The night vision device according to claim 1, further including a power supply module for supplying selected voltage potentials to said image intensifier tube, wherein said optical bed further includes a first engaging means thereon for engaging said power supply module and retaining said power supply module at a first set position relative to said optical bed.

3. The night vision device according to claim 2, further including a circuit board that contains circuits for controlling the operation of said image intensifier tube, wherein said optical bed further includes a second engaging means thereon for engaging said circuit board and retaining said circuit board at a second set position relative to said optical bed.

4. The night vision device according to claim 3, further including an on/off switch electrically coupled to said circuit board, wherein said optical bed further includes a third engagement means thereon for engaging said on/off switch and retaining said on/off switch at a third set position relative to said optical bed.

5. The night vision device according to claim 1, wherein said optical bed contains a battery receptacle thereon for receiving and retaining at least one battery therein.

6. The night vision device according to claim 3, wherein said optical bed is unistructurally molded.

7. The night vision device according to claim 1, wherein said collimator lens arrangement is comprised of a plurality of lens stacked within said tubular structure of said optical bed, wherein spacers are stacked between adjacent lenses to provide a predetermined spacial arrangement among said plurality of lenses.

8. The night vision device according to claim 1, wherein said housing is sized in relation to said optical bed wherein said housing retains said optical bed in a set position within said housing and prevents the optical bed from moving in relation to said housing.

9. The night vision device according to claim 1, wherein said housing has an ocular end and an objective end, and said night vision device further includes a first focusing mechanism coupled to said ocular end of said housing for selectively varying the position of said ocular lens assembly relative to said housing, and a second focusing mechanism coupled to said objective end of said housing for selectively varying the position of said objective lens assembly, wherein said first focusing mechanism is substantially identical to said second focusing mechanism in mechanical composition and function.

10. The night vision device according to claim 1, further including a first aspheric ocular lens disposed within said tubular structure of said optical bed between said collimator lens arrangement and said ocular lens assembly.

11. The night vision device according to claim 10, wherein said ocular lens assembly includes a second aspheric lens that is substantially identical to said first aspheric lens, whereby said first aspheric lens and said second aspheric lens together form the ocular optics of the night vision device.

12. In a night vision device having an image intensifier tube, a circuit board for controlling the image intensifier tube, a power supply module for providing electrical power to the image intensifier tube and an on/off switch for controlling the operating condition of the image intensifier tube, an improved optical bed comprising:
   a image intensifier compartment having an open surface through which the image intensifier can be placed into said image intensifier compartment, said image intensifier compartment being sized to retain the image intensifier tube in one set position when positioned therein;

a tubular structure coupled to said image intensifier compartment, wherein said tubular structure defines an open central region that communicates with the image intensifier compartment;

a plurality of lenses stacked within said tubular structure, wherein said lenses produce a collimator capable of substantially collimating an image produced by an image intensifier tube retained within said image intensifier compartment;

wherein said image intensifier compartment and said tubular structure are unistructurally molded from a common material.

13. The optical bed according to claim 12, further including a first engagement means for engaging the power supply module and retaining the power supply module in a set position relative to said tubular structure.

14. The optical bed according to claim 12, further including a plurality of pawls extending therefrom that are unistructurally formed as part of said optical bed, wherein some of said pawls engage the power supply module and the on/off switch and retain both the power supply module and the on/off switch in set positions relative to the optical bed.

15. The optical bed according to claim 12, further including a means for engaging and retaining the circuit board, wherein the circuit board is held at a set position on said optical bed.

16. The optical bed according to claim 12, wherein the night vision device has ocular optics that include two aspheric lenses and wherein one of the aspheric lenses is contained within said tubular structure.

17. The optical bed according to claim 12, wherein said tubular structure contains a section of a uniform diameter that communicates with said image intensifier compartment and wherein said plurality of lenses are disposed within said section and are spaced apart from each other by spacing elements that are not part of the tubular structure.

18. A optical device, comprising:

a housing having a substantially similar ocular end structure and objective end structure;

a first tubular lens casing coupled to said ocular end of said housing and a second tubular lens casing coupled to said objective lens of said housing, each said tubular lens casing containing at least one lens element therein and having a first region that extends into said housing and a second region that extend out of said housing;

a guide means disposed between the housing and first region of each said tubular lens casing for enabling each said tubular lens casing to move along its longitudinal axis relative to said housing and preventing each said tubular housing from rotating around its longitudinal axis;

a first and second substantially identical focusing assembly coupled to said ocular end structure and said objective lens structure respectively, each said focusing assembly engaging said second region of one of said tubular lens casings, causing each said tubular lens casing to move longitudinally relative to said housing when the associated focusing assembly is rotated relative to said housing.

19. The optical device according to claim 18, further including an image intensifier tube and a collimator assembly contained within said housing and optically aligned with each said tubular lens casing.

20. The optical device according to claim 18, wherein each said focusing assembly includes a collar that treadably engages said second region of the corresponding tubular lens casing and a means for coupling said collar to said housing in a manner that enables said collar to rotate independently of said housing without detaching from said housing.

* * * * *